(No Model.) 3 Sheets—Sheet 1.
C. J. SCHOENING.
BICYCLE.
No. 366,690. Patented July 19, 1887.
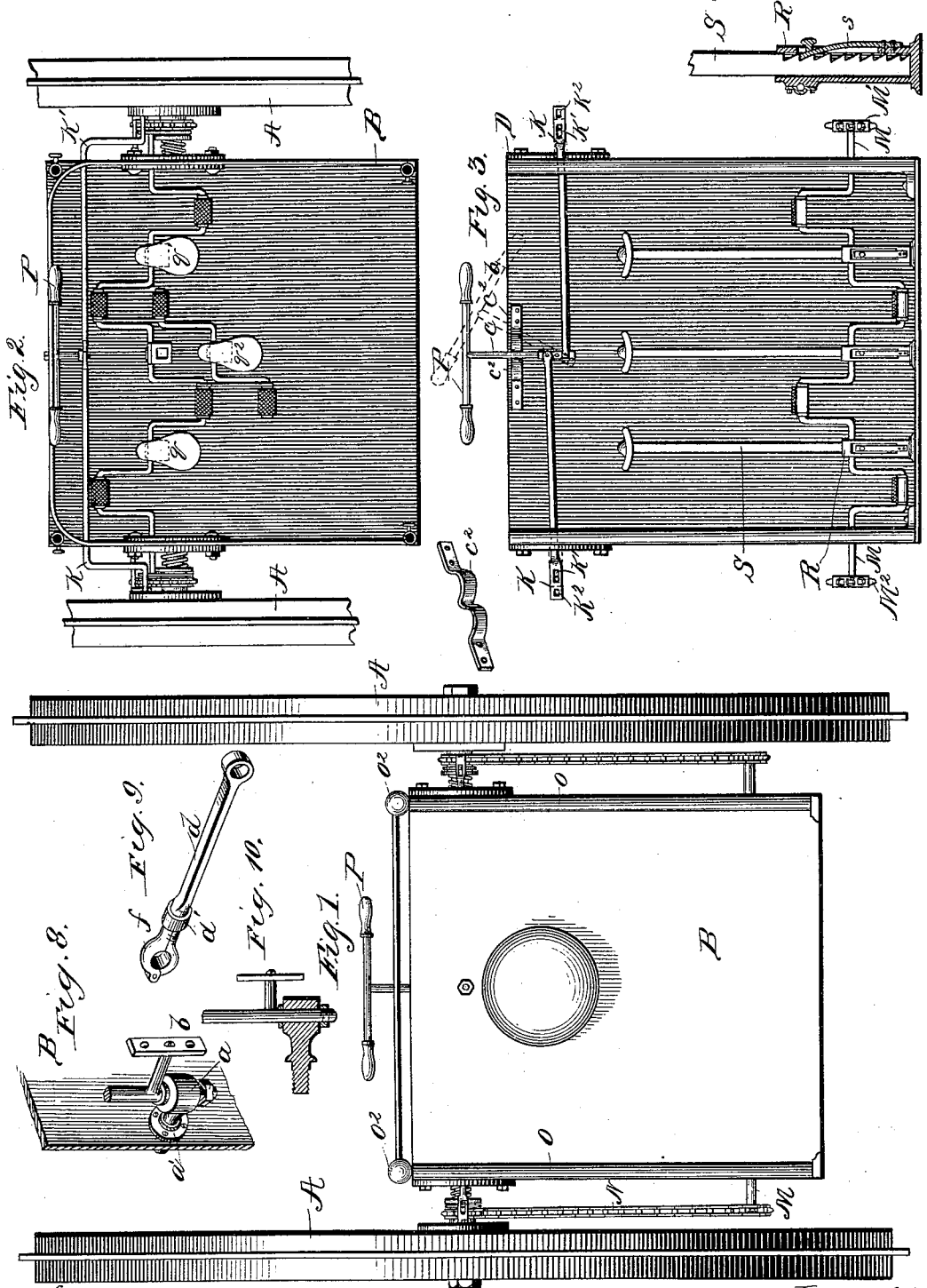
Witnesses.
W. Rossiter
John Staub
Inventor.
Chas. J. Schoening

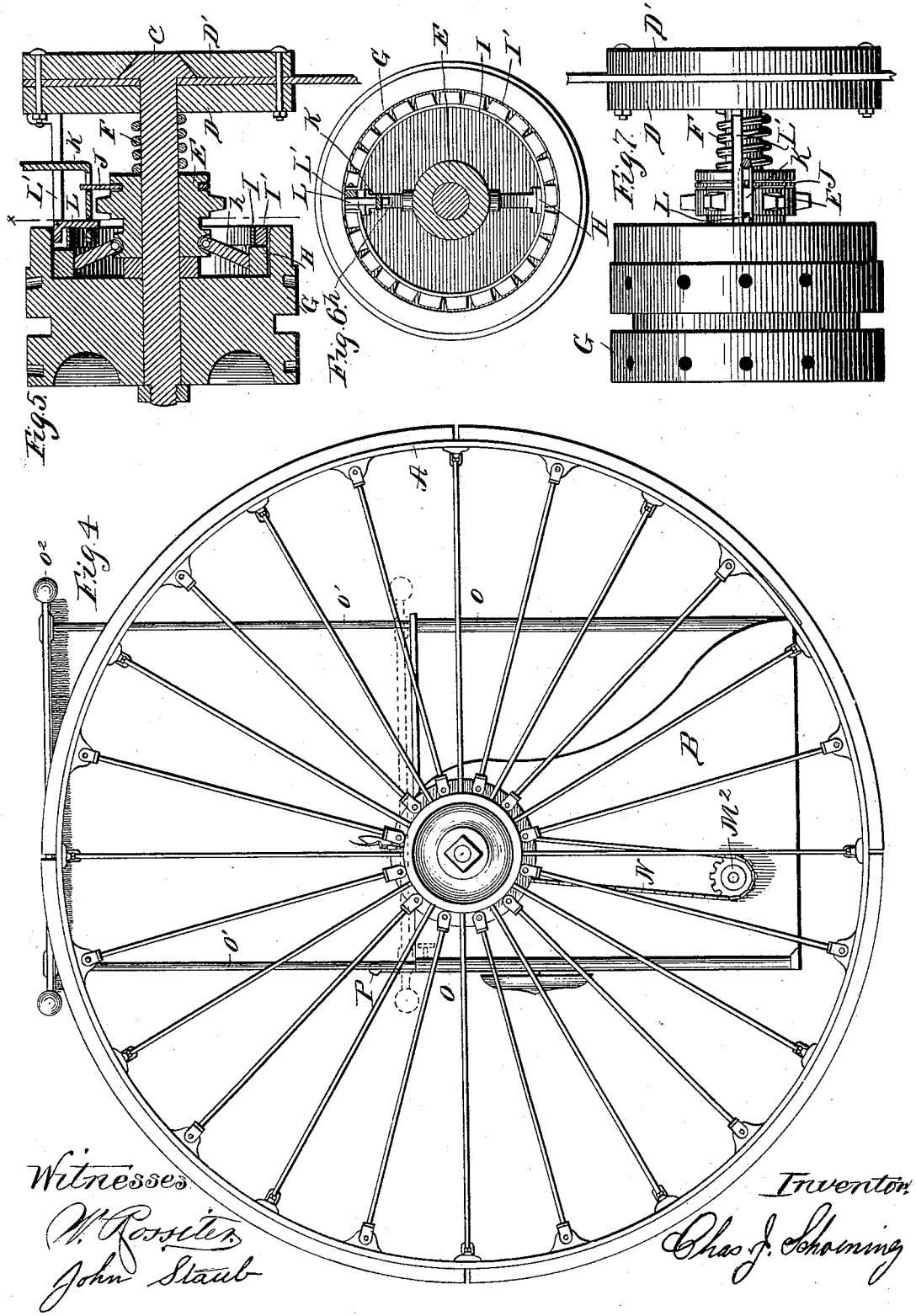

(No Model.)  C. J. SCHOENING.  3 Sheets—Sheet 3.
BICYCLE.
No. 366,690. Patented July 19, 1887.
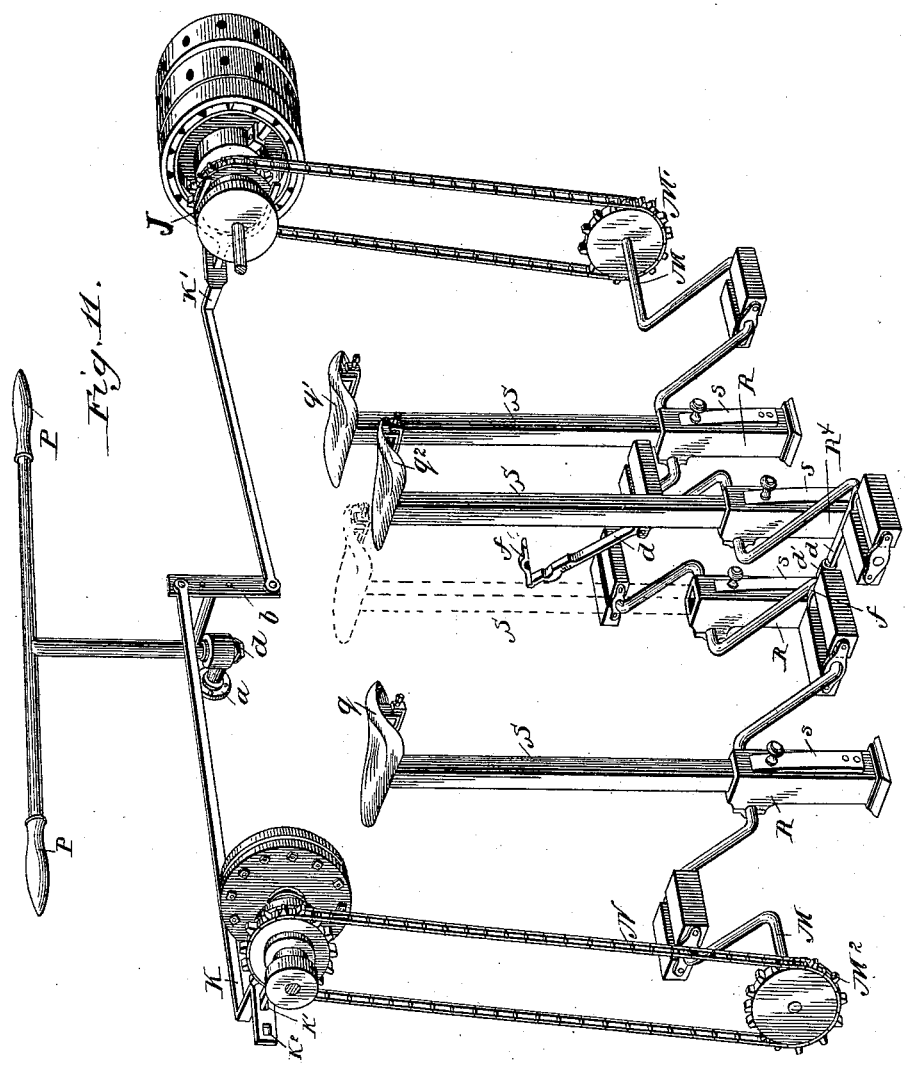
Witnesses.
W. Rossiter
John Staub
Inventor
Chas. J. Schoening

UNITED STATES PATENT OFFICE.

CHARLES JULIUS SCHOENING, OF CHICAGO, ILLINOIS.

BICYCLE.

SPECIFICATION forming part of Letters Patent No. 366,690, dated July 19, 1887.

Application filed October 25, 1886. Serial No. 217,100. (No model.)

*To all whom it may concern:*

Be it known that I, CHARLES JULIUS SCHOENING, a citizen of the United States, residing at Chicago, in the county of Cook and State of Illinois, have invented a new and useful Bicycle, of which the following is a specification.

My invention relates to an improvement in that form of bicycle in which two wheels of the same size are used, the wheels being journaled opposite each other, the body of the vehicle swinging between.

The object of my invention is, first, to provide an improved means of fastening the axle to the body of bicycle; second, an improved steering and brake apparatus; third, an adjustable seat arrangement, by which means the seat can readily be raised or lowered to suit the height or legs of operators; fourth, to provide a means by which one, two, or three persons can ride the one machine and all assist in the propulsion of same; fifth, to secure to a bicycle of this form a canopy and curtain support, by which means the operator or operators may be protected from inclement weather or sun's rays. I attain these objects by the mechanism illustrated in the accompanying drawings, in which a flange-wheel is shown to the bicycle, said wheel being patented to me, Charles J. Schoening, the title of said patent being "flange wheel for railway and road," allowed October 8, 1886, filed September 13, 1886. Any form of wheel can be used, of six feet or more in diameter.

Figure 1 is a front view. Fig. 2 is a plan view showing arrangements of seats for three persons, also arrangement of shafts and connections for transmitting power to wheels. Fig. 3 is a rear view of body, showing steering-bar and connecting-levers, also showing to the right an enlarged sectional view of socket for receiving seat-support, also showing means by which it is held at different heights. Fig. 4 is a side view showing canopy raised. The dotted lines indicate the position of canopy-support when lowered. Fig. 5 is a sectional view of axle, axle-fastening, hub, spur-wheel, and clutch. Fig. 6 is a vertical view, sectional, through line $x$, Fig. 5, showing brake-ring and brake-blocks. Fig. 7 is a front view of Fig. 5. Fig. 8 is a perspective view of eyebolt-journal and bearings of steering apparatus. Fig. 9 is a view of one of the connecting-rods used to connect the cranks of fourth standard to main shaft. Fig. 10 is a sectional view of Fig. 8. Fig. 11 is a perspective view of steering and brake mechanism, showing also more clearly the connection between auxiliary cranks or third rider's seat and main shaft.

Similar letters refer to similar parts throughout the several views.

A A are the wheels; B, the body of vehicle. C, Figs. 5 and 7, is axle with conical head fastened to the body by circular metal disks D on one side and D' on the other, D' having a corresponding conical opening to fit over head of axle, the whole being bolted together by bolts passing through.

E is a combined spur-wheel and clutch, $h$ being clutch-arms, and H friction contact-blocks, said clutch and spur-wheel sliding loosely on shaft, being pressed toward the hub by coil-spring F and disengaged from hub G by the drawing in of bent lever K, said lever engaging with fork J (shown more in detail in Fig. 11) a brake mechanism, Figs. 5 and 6, consisting of a steel band, I, bent in the form of a circle, the two ends being bent at right angles, one end being permanently fastened to a bar, L', rigidly fastened to the body of vehicle, there being also secured to the bar L' by the same bolt that secures steel band I a wedge-shaped headed lever, L, made like an inverted L—thus, ⌐—the other end of steel band I pressing against said lever, the lever being operated by bent lever K, the outside circumference of steel band I being faced with wooden blocks at suitable intervals, secured thereto by bolts or screws, this form of brake being a well-known form now in extensive use, being operated by enlarging or diminishing the size of band, this being accomplished in this instance by wedge L and lever K.

M, Figs. 3 and 11, is a quadruple crankshaft, being supplied with pedals.

$M^2$ are spur-wheels rigidly fastened to shaft M and connected to spur-wheel E by link belt N.

O, Figs. 1 and 4, are hollow metal standards, secured one to each corner of body, and designed to contain other metal tubes, $O^2$, said tubes being connected to each other by horizontal bars at the side and front, and finished at the corners by hollow balls, the tubes $O^2$ being so arranged as to be drawn out of tubes O nearly their entire length and held in that position by spring-catch, the whole being designed to support a canopy buttoned on each side across the top; and when desired a curtain with a suitable opening in front can be hung around, completely protecting the riders or operators from inclement weather.

P, Figs. 3 and 11, is a steering bar or handle, journaled in eyebolt a, Fig. 8, said steering-bar having attached thereto a perpendicular bar, b, connected by a short horizontal cross-piece, the whole being designed to operate bent levers K, which are connected to spur-wheel and brake on each side of vehicle by the shank of fork J, passing through slotted hole K', the brake-lever L being engaged in hole K². The steering-bar P has two independent movements, one being in a horizontal plane, this movement shifting connecting-levers K from side to side, the other being a perpendicular movement, as shown in dotted lines, Fig. 3, this movement drawing in both bars K, disengaging both clutches from their respective wheels and setting the brakes on each wheel simultaneously, the steering-bar P being held in a normally perpendicular position by a double bow-spring, $c^2$, (shown in perspective,) fastened to the front of body and pressing against steering-bar. It will be seen that the steering-bar and handles P are similar to and are operated the same as the steering apparatus of bicycles now in use—being turned toward the left in a horizontal plane when it is desired to change the course of the vehicle to the left, and toward the right when desiring to go to the right. When it is desirous to change the course of the vehicle quick or turn short, the handle P is turned as far as it will permit. This motion disengages spur-wheel and clutch E and draws out brake-lever L, expanding brake-circle I, setting brake on the wheel, stopping all motion. The other wheel only being driven, the vehicle is turned in its own breadth.

R is a socket, of which there are three, permanently fastened to vehicle for the support of seat-standards S, said standards to be raised or lowered by the engagement of spring s, fastened to the rear of sockets R, and engaging in serrated or toothed section of standard S through opening in socket R, (shown in section in Fig. 3,) said sockets R having also cast thereto journals or bearings for the reception of main shaft M. There is also an auxiliary socket, R⁴, Fig. 11, also supplied with a double crank-shaft and pedals, said cranks being connected to main shaft M by connecting-bar d, (shown in Fig. 9 in perspective,) one end of said bar being permanently fastened to crank-shaft—one on each side—the other end being supplied with a split journal, F, working as upon a hinge and held in a closed position by ring d', said auxiliary socket R⁴, with its attached cranks and seat, being fastened to the bottom of vehicle by thumb-screws, and adapted to be removed and stored when not in use, it being designed only for third person, or when three are riding.

Having thus described my invention, I am aware that a brake of the kind shown on my machine has been made before. Therefore I do not claim the brake.

What I do claim as my invention, and desire to secure by Letters Patent, is—

1. A bicycle having two wheels of the same size journaled opposite each other on an independent axle, C, for each wheel, said axle having a conical head and fastened to the body by two circular plates, D and D', fastened together by bolts clamping both plates together with head of axle between.

2. An adjustable seat-support and shaft-journal, R, having fastened thereto a flat spring, s, designed to engage in serrated seat-standard S.

3. The combination of a socket, R⁴, with seat-support and auxiliary cranks, and with connecting-rods d, fastened temporarily to floor of vehicle by thumb-screws, the whole being designed to serve as seat for third person and to transmit power to main shaft.

4. A bicycle having two wheels of the same size journaled on opposite sides of a swinging body, B, said body supporting from its floor the shaft-journals and seat-sockets R R R and R⁴, and seats Q Q' Q², all combined and arranged to carry one, two, or three persons, and that all may assist in the propulsion of the same.

5. An improved steering and brake mechanism, composed of a horizontal T-bar with suitable bent levers and journaled into a journaled eyebolt, having a motion in a horizontal as well as a vertical plane, adapted to disengage either clutch or engage brake on either wheel, or to disengage both clutches and set both brakes simultaneously.

6. A bicycle having two wheels of the same size journaled on opposite sides of a swinging body, said body having fastened at each corner of the floor a hollow metal tube, O, into which slides a smaller tube, O', each two side tubes, O', being connected by a horizontal bar, O², the whole designed to support a canopy overhead, and when desired a curtain around, all substantially as and for the purpose herein set forth.

CHARLES JULIUS SCHOENING.

Witnesses:
GEO. P. KNOWLES,
ISAAC MARSH.